United States Patent [19]

Soe

[11] Patent Number: 4,826,699
[45] Date of Patent: May 2, 1989

[54] METHOD FOR THE PRODUCTION OF A POWDERED ADDITIVE FOR USE IN PREPARING FOOD PRODUCTS HAVING A FOAMED STRUCTURE

[75] Inventor: Jorn B. Soe, Mundelstrup, Denmark

[73] Assignee: Grindsted Products A/S, Denmark

[21] Appl. No.: 13,668

[22] Filed: Feb. 12, 1987

[30] Foreign Application Priority Data

Feb. 14, 1986 [DK] Denmark ................................. 712/86

[51] Int. Cl.$^4$ ........................... A23D 5/02; A21D 2/16
[52] U.S. Cl. ..................................... 426/564; 426/602; 426/603; 426/653; 426/654; 426/474
[58] Field of Search ............... 426/653, 654, 602, 603, 426/96, 474, 554, 570, 565, 564

[56] References Cited

U.S. PATENT DOCUMENTS

| | | | |
|---|---|---|---|
| 3,216,829 | 11/1965 | Hansen | 426/654 |
| 3,282,705 | 11/1966 | Hansen | 426/654 |
| 3,396,039 | 8/1968 | Leo et al. | 426/654 |
| 3,494,771 | 2/1970 | Thompson | 426/653 |
| 3,549,382 | 12/1970 | Hansen | 426/653 |
| 4,310,556 | 1/1982 | Suggs | 426/654 |
| 4,609,560 | 9/1986 | Yuda et al. | 426/653 |

*Primary Examiner*—Jeanette Hunter

[57] ABSTRACT

Food emulsifiers for use in food products having a foamed structure such as chemically leavened and yeast raised bakery products, whipped desserts, icecream, mousse, filling custards, toppings and icings are prepared by treating a conventional emulsifier or emulsifier mixture in the melted state with an inactive gas, preferably $CO_2$, under pressure, after which the thus-treated emulsifier or emulsifier mixture is passed directly to spray crystallization and evaporation of the gas. Emulsifiers thus treated impart an increased volume to the food products prepared therewith in comparison with corresponding food products prepared with the same emulsifier without gas treatment. The treatment imparts improved shelf life to bread baked from a yeast-raised dough into which a $CO_2$-treated emulsifier has been incorporated.

13 Claims, No Drawings

METHOD FOR THE PRODUCTION OF A POWDERED ADDITIVE FOR USE IN PREPARING FOOD PRODUCTS HAVING A FOAMED STRUCTURE

CROSS-REFERENCE TO RELATED APPLICATIONS

Applicant claims priority from Danish patent application No. 712/86, filed Feb. 14, 1986.

FIELD OF THE INVENTION

The present invention relates to a method for the production of a powdered additive for use in preparing food and food-like products having an improved foamed structure, such as chemically leavened and yeast raised bakery products, whipped desserts, icecream, mousse, filling custards, toppings and icings, said additive comprising an emulsifier.

The additive in question is based on food emulsifiers. In the present specification, "emulsifier" means a single emulsifying agent or a mixture of two or more emulsifying agents. The additive may contain substances not having emulsifying effect and it will be appreciated from the specification that there is not aimed at a simple emulsifier or emulsifier system. Thus, for instance, food additives more or less based on monoglycerides in bakery products act specifically on the starch and in finished bread and cakes counteract staling because of a delay of retrogradation of the gelatinized starch. In cakes, whipped desserts, icecream, toppings and icings the additives act as an aerating agent by forming and maintaining the dispersion of air in the other components of the food or other edible product that is essential for the nature of the product.

The bakery products first and foremost aimed at are the chemically leavened ones having a large volume, especially the so-called sponge cakes, Madeira cakes and layer cakes, but moreover there has also by the process been prepared additives suitable for use in, i.a., yeast raised doughs for wheat bread.

The additive is based on emuslifiers and emulsifier blends well-known per se and frequently containing one or more distilled monoglycerides of fatty acids, in connection with emulsifiers for cakes, notably saturated fatty acids. Besides and sometimes instead of the distilled monoglycerides derivative thereof may be present, e.g. citric acid esters of mono-diglycerides, acetic acid esters of monodiglycerides, polyglycerol esters of fatty acids, propylene glycol esters of fatty acids, calcium or sodium stearoyl lactylate, diacetyl tartaric acid esters of monodiglycerides, and/or lactic acid esters of mono-diglycerides. The emulsifying agents will normally contain free hydroxy groups, most frequently at least one per molecule. Besides the emulsifier, edible, finely pulverized solid carrier materials may be present in the additive, e.g. soya meal, skim milk powder, defatted soya meal, wheat gluten, sodium caseinate and maltodextrins. In the finished additive the emulsifier may be present entirely or predominately in the $\alpha$-crystalline form, dependent on the composition of the additive.

BACKGROUND OF THE INVENTION

There is known a very large number of baking and other food additives based on undistilled or distilled monoglycerides, and for many different purposes. Thus, such additives have found a widespread use in cakes for the improvement of whipping effect and improved mixing of the ingredients whereby for instance sponge cakes may be prepared by an "all-in" procedure. The use of emulsifiers will also improve the stability of the cake batter and give a nice and homogenous cake which is more attractive for the consumer. Baking aids for cakes traditionally have been employed in the form of a paste (e.g. stirred with water) or in the form of a powder, in both cases containing normally 20 to 40% emulsifier. In order for emulsifiers to having whipping effect, it is necessary that the emulsifier is present in the $\alpha$-crystalline form. Some emulsifiers in the $\alpha$-crystalline form are able to stabilize a foam system consisting of protein, starch, water (or air) and sugar as for instance in cakes. This property is the reason for the good whipping effect of these emulsifiers.

In order to ensure that, e.g., monoglyceride is present in the $\alpha$-crystalline form, one has combined monoglyceride with other emulsifiers with capability of stabilizing the monoglyceride in the $\alpha$-crystalline form.

From i.a. U.S. Pat. Nos. 3,034,897 and 3,034,898 it is known that monoglycerides in the $\alpha$-crystalline form may be stabilized to a considerable degree by causing the monoglyceride to be present in conjoined crystals together with fatty acid esters of propylene glycol. The powdery compositions thus known must be stirred thoroughly into water (be "hydrated") in order to be usable.

In DK patent specification No. 107,347 and the corresponding U.S. Pat. No. 3,479,189 there is described a storage stable baking and whipping aid in a state hydrated into the form of a paste or gel and meant especially for sweet cakes and desserts, and containing monoglyceride, propylene glycol monoester, both of fatty acids in which at most 5% of the fatty acid residues are unsaturated, and a hydrophilic co-emulsifier in a solvent mixture consisting of water and at least one organic solvent in the form of a liquid edible alcohol, a liquid edible ester thereof or aqueous sorbitol containing a crystal inhibitor. As co-emulsifier, the purpose of which is to contribute to the dispersion of the monoesters into the medium and the baking aid into the other components of the batter or dessert, there is especially used alkali metal salts of fatty acid, but also for instance lactylated or acetylated mono-diglycerides may be used for the purpose.

The preparation of such paste- or gel-formed baking aids is laborious and comparatively expensive and the keeping quality in the active $\alpha$-crystal form is limited. To some degree they have therefore been replaced by powdery products, e.g. formed from the above described paste- or gel-formed mixture by emulsifying in water together with a suitable carrier substance, e.g. defatted milk dry matter or maltodextrin, and subsequent homogenization and spray drying to form a powder having a suitable fineness.

To obtain a satisfactory result with powdery baking aids it is necessary to prepare an emulsion of the emulsifier, water and carrier substance, which is thereupon spray dried. There is thereby obtained a good distribution of the emulsifiers and a large surface on the carrier substance, which is important in order to the whipping effect in the cake batter.

The preparation of such emulsifier mixtures is described in U.S. Pat. No. 2,913,342 and Swedish patent specification No. 197,856. As inactive carrier substances there is employed sucrose, casein and sodium caseinate.

The advantage of powdery products is that they are easier to use and dose correctly and uniformly than gel-formed products and that they can be used in premixed dry cake mixes and dessert mixes.

The problems mentioned in the preparation of pastes or gels and the costs of spray drying and the content of inactive carrier substances such a milk dry matter or maltodextrin, however, set a limit for the use of these products, partly for economic and partly for technological reasons.

In order for such powdery emulsifier mixtures to act as aerating agents in cake batters and whipped desserts and similar products, it is important that the powder particles can be dispersed and swell in the aqueous phase present in the product, be it a cake batter or whipped dessert, at the temperature at which the ingredients are mixed, normally 20° to 25° C.

The particle size of a baking or whipping aid has an important influence on the dispersibility in, e.g., batter systems. This again influences the effect thereof.

An improved dispersibility has, i.a., been obtained by the abovementioned powdery emulsifiers containing (hydrophilic) carrier substances.

A further improvement of the dispersibility has been obtained by incorporating monoglyceride containing unsaturated fatty acid residues into the emulsifier mixtures. However, such emulsifier mixtures do not give a good whipping effect and therefore are not particularly suitable for cakes of the types especially aimed at by the invention, or for whipped desserts, ice cream, toppings or icings.

Besides the already mentioned powdery mixture of monoglycerides and propylene glycol monoesters, there has recently appeared two descriptions of more efficient additives for cakes. One is CA patent specification No. 1,113,304 which describes emulsifiers for chemically leavened bakery products, consisting of 25–75% by weight of propylene glycol monoesters, 5–30% by weight of monoglycerides of saturated $C_{8-22}$ fatty acids, 5–30% by weight of monoglycerides of unsaturated $C_{8-22}$ fatty acids and 10–30% by weight of mono-succinylated monoglycerides of saturated $C_{8-22}$ fatty acids (the latter succinylated monoglyceride thus still contains one free hydroxy group); the emulsifier is stated to be a solid solution and is prepared by mixing the components in the molten state, after which the mixture is cooled and pulverized.

The other is U.S. Pat. No. 4,310,556 which describes "food emulsifiers" consisting of a likewise solid solution in the form of a powdery mixture of about 15–40 parts by weight of succinylated monoglycerides, about 25–45 parts by weight of monoglycerides having an iodine number of about 2–15, about 15–40 parts by weight of propylene glycol monoesters and about 5–18 parts by weight of $C_{8-22}$ fatty acids.

From U.S. Pat. No. 4,483,880 there is known a powdered emulsifier mixture, generally usable in starch-containing foods, consisting of 65–90% monoglycerides containing saturated fatty acid, 35–10% monoglycerides containing unsaturated fatty acid and less than 10% of one or more esters of diacetyltartaric acid, tartaric acid, acetic acid or citric acid and monoglyceride, which are mixed in the melted state after which the melt is directly spray-crystallized to form a powder, or the melt is cooled or pulverized to a powder having a suitable particle size.

BRIEF DESCRIPTION OF THE INVENTION

In the present invention the starting point may be any emulsifier based baking and other food additive, including anyone of the additives, emulsifiers and emulsifier mixtures discussed hereinbefore, and its object is to provide a method by which the effect on the desired foam structure physically is improved beyond that obtained by chemical measures.

Surprisingly, this is obtained if according to the invention the components forming the food additive are treated in a state in which any emuslifier present is melted, with an inactive gas at elevated pressure, after which the thus-treated additive components comprising an emulsifier or emulsifier mixture is passed directly to spray crystallisation of any emulsifier present while cooling and evaporating the gas.

There is hereby obtained a considerable increase of the volume of food and food-like products prepared from ingredients containing an additive prepared by the method according to the invention, as will be apparent from the Examples and Experimental Series hereinafter. The same effect is obtained when preparing whipped desserts while using the baking and whipping aid prepared by the method according to the invention.

It has moreover surprisingly been found that bread baked from a yeast dough containing a baking aid or emulsifier thus produced has a better anti-staling effect, i.e. becomes dry and hard later than a bread baked from the same dough with otherwise the same baking aid (additive) in powder from which has not been subjected to the gas treatment described.

The treatment with the inactive gas, e.g. carbon dioxide also imparts an increased volume to the baking aid itself. Thus a baking aid "Gatodan" ® 1304 (composition, see later) at normal spray crystallisation has a bulk weight of 516 g/l, whereas the same baking aid treated with $CO_2$ according to the invention has a bulk weight of 135 g/l. The $CO_2$-treatment imparts a high surface to the powder.

The treatment with $CO_2$ furthermore imparts an unexpected deodorizing effect to the baking aid itself, which probably is due to the scavenge of small impurities, causing the odor, with the inactive gas by the subsequent spray crystallisation.

DETAILED DESCRIPTION OF THE INVENTION

With the expression "inactive gas" there is meant both a single gaseous substance that does not influence the emulsifier and other possible components of the food additive chemically, and a mixture of such gaseous substances.

The preferred gas for use in the treatment is carbon dioxide and according to the invention the treatment with carbon dioxide is preferably carried out at a $CO_2$ pressure of 30 to 100 bar.

The treatment with carbon dioxide may be carried out batchwise, continuously or semicontinuously. In practice it is usually carried out until equilibrium (frequently saturation) between $CO_2$ dissolved in the emulsifier and $CO_2$ in the atmosphere in the pressurized vessel, but saturation is not necessary per se. The pressure treatment does not need take place with pure carbon dioxide, there may also be other gases such as nitrogen present in the pressurized vessel, but normally it will be most convenient to use pure $CO_2$, which is industrially readily available. When carbon dioxide pressure is mentioned, there is aimed at $CO_2$-pressure or $CO_2$ partial pressure.

One preferred embodiment is to carry out the treatment batchwise with substantially pure, gaseous $CO_2$ at a pressure of about 60 bar. It has hereby in practice been found that saturation occurs within a few minutes.

In an industrial scale, however, it will be more practical according to the invention to carry out the $CO_2$ treatment continuously by pumping liquid $CO_2$ into a pressure vessel containing the additive components with any emulsifier present in the melted state, the amount of liquid $CO_2$ being maintained at maximum 10% by volume of the amount of additive. It has been found that this volume of liquid emulsifier plus other possible components of the additive (which will only be present in small amounts) substantially causes saturation of the emulsifier or emulsifier mixture. The vessel is provided with a discharge conduit through which the $CO_2$-treated baking and whipping aid is continuously passed to the nozzle of the spray crystallisation device.

Another gas which may conveniently be used for the gas treatment is nitrogen. As nitrogen is less soluble in food emulsifiers than carbon dioxide, the gas treatment with nitrogen should preferably be carried out at a somewhat higher pressure than the carbon dioxide treatment, such as 50 to 180 bar $N_2$ pressure or partial pressure.

A further useful gas for the gas treatment according to the present invention is argon, optionally in mixture with carbon dioxide and/or nitrogen. Air is not normally usable for the gas treatment according to the invention because of its content of oxygen, which might react with unsaturation in the emulsifier. However, if the emulsifier contains only saturated chemical bonds and other possible components of the additive will not be harmed by oxygen at the temperature and pressure prevailing during the gas treatment, air or, more preferred, $CO_2$ and/or $N_2$ enriched air may be used.

The temperature of the treatment may be 45° to 100° C. whereby the temperature must be so high that the emulsifier is melted during the gas treatment. The melting range of the emulsifiers or emulsifier mixtures that come into question in the present context vary, but are frequently in the range of 35° to 80° C.; one chooses ordinarily a temperature a little above the melting range of the material, e.g. 5° to 20° C. above it, i.a. dependent on how well-defined it is. It will be appreciated that the aforementioned optionally present edible, finely pulverized solid carrier materials are not to be melted; they are chosen so as to have a particle size not imparting any risk of clogging the nozzle of the spray crystallizer.

The emulsifier or emulsifier mxiture is prepared in known ways except for the pressure gas treatment, and may have a known composition of matter as described e.g. in the abovementioned publications, or as otherwise well-known.

The treatment according to the invention will be illustrated more fully by the following Examples, followed by a series of experiments with the use of emulsifier mixtures with and without the treatment according to the invention.

EXAMPLE 1

All emulsifiers used in the Experiments to follow were prepared in the following manner:

The chosen emulsifier was placed in a pressure vessel provided with a supply line for $CO_2$, a discharge line leading to a spray crystallization nozzle and a stirrer. Before the $CO_2$-pressurizing, the pressure vessel containing the emulsifier mixture was brought into temperature equilibrium at about 80° C., after which $CO_2$ was added and vented twice to remove air. Then a $CO_2$ pressure of 60 bar was established and stirring was initiated. The stirring continued for 5 minutes whereby saturation with $CO_2$ took place, and subsequently the emulsifier mixture was pressed through a nozzle of about 0.5 mm diameter. The emulsifier crystallized while evaporating $CO_2$ dissolved therein. This caused an expansion so as to form a porous powder having a bulk weight of about 130 to 250 g/l, depending on the exact composition of the emulsifier.

As mentioned hereinbefore, the treatment of "Gatodan" 1304 in this manner provided it as a powder having a bulk weight of 135 g/l.

EXAMPLE 2

Example 1 was repeated with use of $N_2$ instead of $CO_2$, and at a pressure of 60 bar and a temperature of 80° C., followed at once by spray crystallization. The emulsifier used in this experiment was "Gatodan" 1304 and the powder product obtained had a bulk weight of 326 g/l; "Gatodan" 1304, after normal spray crystallization has a bulk weight of 516 g/l.

Because of the smaller specific surface area "Gatodan" 1304 $N_2$ expanded at the pressure stated has lesser effect in the food product in which it is to be used than the same emulsifier expanded with $CO_2$ at the same pressure, but still a larger effect than "Gatodan" 1304 spray crystallized in the conventional manner.

In the Experiments described hereinafter, a number of different emulsifiers are used. They are identified hereinbelow. The names in quotes are all registered trade marks for emulsifiers supplied by Grindsted Products A/S, Arhus, Denmark.

"Acidan" BC is a mixture of citric acid ester of monoglyceride (MG) and monoglyceride made from edible, refined fat. Acid value 20–35, saponification value 225–255, m.p. about 60° C.

"Acidan" N 12 is a neutralized citric acid ester of MG made from edible, refined, hydrogenated fat. Acid value 10–25, saponification value 220–250, iodine value maximum 3, m.p. about 55° C.

"Amidan" SDM-T is a distilled monoglyceride (MG) in powder form having a total content of MG of at least 90%, an iodine value of about 40 and m.p. about 60° C.

"Artodan" CP 80 is a calcium stearoyl lactylate prepared from refined fatty acids, ester value 135–165, acid value 70–90, iodine value maximum 2, m.p. about 40° C.

"Artodan" SP 50 is a sodium stearoyl lactylate prepared from refined fatty acids, ester value 150–190, acid value 60–80, iodine value maximum 2; fine powder.

"Artodan" SP 55 is as "Artodan" SP 50, but a coarse powder.

"Cetodan" 50-00 is acetic acid esters of monoglycerides (acetylated monoglycerides). Acid value maximum 2, iodine value maximum 2, monoglycerides content about 16%, saponification value about 285, m.p. 38°–42° C.

"Cremodan" Super is a mono-diglyceride made from edible, refined, hydrogenated tallow or vegetable fat. Monoester content minimum 58%, iodine value maximum 2%, m.p. about 60° C.

"Dimodan" OT is a distilled MG having an MG content of at least 90%, prepared from edible, partially hydrogenated soybean oil. Iodine value about 55.

"Dimodan" PM is a distilled MG with an MG content minimum 90%, prepared from edible, refined, hydrogenated lard or tallow.

"Dimodan" PV is a distilled MG made from edible, refined, hydrogenated soybean oil. MG content minimum 90%. Iodine value maximum 2, m.p. about 70° C.

"Dimodan" S is a distilled MG with a MG content of at least 90%, prepared from edible, refined lard.

"Famodan" MS is a sorbitan monostearate made from edible, refined fatty acids. Iodine value maximum 2, saponification value 147–157, hydroxyl value 235–260, acid value 5–10, m.p. about 54° C.

"Gatodan" 505 is an emulsifier consisting of partial esters of polyglycerol/glycerol with mainly stearic and palmitic acids. Iodine value maximum 2, acid value maximum 4, saponification value 140–160.

"Gatodan" 1304 is a mixture of 35.0% b.w. "Dimodan" PM, 48.0% "Promodan" SP, 9.0% "Artodan" SP 55, 3.0% potassium stearate (co-emulsifier), 2.5% "Panodan" AB 100 and 2.5% "Panodan" AM.

"Gelodan" PI is a stabilizer blend consisting of guar gum, hydroxypropylmethyl cellulose (HPMC), sodium carboxymethyl cellulose (CMC) and carrageenan.

"Lactodan" B 30 is a lactic acid ester of MG, prepared from edible, refined, hydrogenated fat and having a content of lactic acid of 25–30%.

"Lactodan" 3-025 is as "Lactodan" B-30, but having only half as high a content of lactic acid.

"Lactodan" 1315/90 is a lactic acid ester of MG (one free OH group), main fatty acids stearic and palmitic. Content of lactic acid 14–17%. Iodine number maximum 2, acid number maximum 5, saponification number 210–230.

"Lipodan" TL 50 is a mixture of polyglycerol esters of $C_{16}$ and $c_{18}$ saturated fatty acids and lactic acid ester of mono-diglycerides.

"Panodan" AB 100 is a diacetyl tartaric acid ester of mono-diglycerides, made from edible, refined fats. Iodine value about 40.

"Panodan" AM is a diacetyl tartaric acid ester of mono-diglycerides, made from edible, refined fats; iodine value maximum 2.

"Panodan" 150 is a diacetyl tartaric acid ester of mono-diglycerides, and mono-diglycerides, made from edible, refined fats. Iodine number maximum 2, acid value maximum 2, saponification value 325–355, m.p. about 60° C.

"Promodan" SP is distilled propylene glycol esters prepared form edible, hydrogenated fatty acids. The monoester content minimum 95%, m.p. about 38° C.

"Promodan" SPV is a distilled propylene glycol ester made from hydrogenated vegetable fatty acids. Monoester content minimum 95%, iodine number maximum 3, m.p. about 40° C.

"Steadan" 80 is a 30% solution of potassium stearate in glycerol.

"Steadan" 300 is potassium stearate.

"Triodan" 55 is a polyglycerol ester made from edible, refined fatty acids and in which the polyglycerol moiety is mainly di-, tri- and tetraglycerol. Iodine value maximum 2, saponification value 130–145.

Experimental Series 1

(a) The effect of the $CO_2$-expanded emulsifier is tested in a standard sponge cake prepared from the following cake recipe:
208 g sugar, fine powder
180 g wheat flour
60 g maize starch
14 g baking powder
200 g whole egg
150 g water
x g emulsifier, "Gatodan" 1304

All the ingredients are poured into a mixing bowl and whipped for 6 min. on a "Hobart" ® N 50 mixer (200 rpm).

The specific weight of the cake batter is determined. 400 g of cake batter is transferred to a baking tin and it is baked at 180° C. for about 35 min. After baking the cake is cooled to room temperature and the volume is determined according to the "rape seed displacement" method. In this method a number of baked products, after having been baked, are placed in a box having a known volume. The box is then filled up with rape seeds. They are poured out and their volume determined. The volume of the baked products is the difference between the volume of the box and that of the rape seeds.

The specific weight of the cake batter and the volume of the baked cake are used as quantitative parameters for the effect of the emulsifier.

The results of these experiments are shown in Table 1, first part, which also shows the age of the emulsifier mixture before the preparation of the cake batter.

(b) To assess the keeping qualities of the emulsifier mixture as a function of time, investigation has also been carried out with a finished mixture of the dry matter ingredients used in sponge cake, experience having shown that the keeping qualities of the emulsifier, i.e. the whipping effect, is lower in mixtures in which, i.a., flour containing 10 to 15% water is present.

The ready-mixed (commercial) cake mix employed has the following composition:
188 g flour
208 g sugar, fine powder
60 g maize starch
14 g baking powder
x g emulsifier, "Gatodan" 1304

The ingredients are thoroughly mixed and are left standing at room temperature before the cake is prepared (0–6 months). After this, the cake mix is transferred to a mixing bowl and the following ingredients are added:
200 g whole egg
50 g water Thereafter, the cake is prepared as described above.

The results are shown in Table 1, last part. The age here is the age of the cake mix before admixing egg and water.

TABLE 1

| Emulsifier | Amount of emulsifier | Age | Bulk weight of batter, g/l | Volume of cake from 400 g batter, ml |
|---|---|---|---|---|
| (a) in directly prepared cake | | | | |
| "Gatodan" 1304 | 2.1% | 1 week | 314 | 2010 |
| "Gatodan" 1304 | 2.1% | 6 weeks | 338 | 1970 |
| "Gatodan" 1304 | 2.1% | 3 months | 395 | 1720 |
| "Gatodan" 1304 | 2.1% | 6 months | 467 | 1500 |

TABLE 1-continued

| Emulsifier | Amount of emulsifier | Age | Bulk weight of batter, g/l | Volume of cake from 400 g batter, ml |
|---|---|---|---|---|
| $CO_2$-expand. "Gatodan" 1304 | 2.1% | 1 week | 242 | 2080 |
| $CO_2$-expand. "Gatodan" 1304 | 2.1% | 4 weeks | 296 | 2050 |
| $CO_2$-expand. "Gatodan" 1304 | 2.1% | 3 months | 250 | 2030 |
| $CO_2$-expand. "Gatodan" 1304 | 2.1% | 6 months | 284 | 2175 |
| $CO_2$-expand. "Gatodan" 1304 | 1.4% | 4 weeks | 296 | 2050 |
| $CO_2$-expand. "Gatodan" 1304 | 1.4% | 6 months | 300 | 2160 |
| (b) in ready-made baking mix | | | | |
| "Gatodan" 1304 | 2.1% | 1 week | 430 | 1625 |
| "Gatodan" 1304 | 2.1% | 6 months | 494 | 1480 |
| $CO_2$-expand. "Gatodan" 1304 | 2.1% | 1 week | 262 | |
| $CO_2$-expand. "Gatodan" 1304 | 2.1% | 1 month | 302 | 2120 |
| $CO_2$-expand. "Gatodan" 1304 | 2.1% | 3 months | 311 | 1960 |
| $CO_2$-expand. "Gatodan" 1304 | 2.1% | 6 months | 360 | 1900 |
| $CO_2$-expand. "Gatodan" 1304 | 1.4% | 1 week | 342 | 1980 |
| $CO_2$-expand. "Gatodan" 1304 | 1.4% | 1 month | 376 | 1880 |
| $CO_2$-expand. "Gatodan" 1304 | 1.4% | 3 months | 390 | 1860 |
| $CO_2$-expand. "Gatodan" 1304 | 1.4% | 6 months | 438 | 1700 |

Table 1 clearly shows that the $CO_2$ treatment of the emulsifier decreases the bulk weight of the cake batter (increases its volume) and especially increases the volume of the finished cake. It also shows that the keeping qualities of the volume increase of the cake caused by the $CO_2$-treatment are good, both when the emulsifier is added just before the baking and when it has been added to the ready cake mix.

Experimental Series 2

"Gatodan" 1304 was tested in similar experiments as in the first part of Experimental Series 1, but with variations of the pressure and temperature at which the emulsifier had been treated with carbon dioxide, viz. at temperatures of 60° C. and 80° C. and pressures 30 and 60 bar, in all cases followed by spray crystallization as described in Experimental Series 1.

The results are shown in Table 2 below, referring to the same recipe of sponge cake batter and same baking procedure as in Experiment 1.

TABLE 2

| $CO_2$ pressure, bar | 30 | 30 | 60 | 60 |
|---|---|---|---|---|
| emulsifier temperature, °C. | 80 | 60 | 80 | 60 |

TABLE 2-continued

| sponge cake preparation with 10 days' old emulsifier | | | | |
|---|---|---|---|---|
| amount of emulsifier, % | 1.4 | 1.4 | 1.4 | 1.4 |
| weight of batter, g/l | 292 | 419 | 295 | 300 |
| volume of cake from 400 g batter, ml | 2060 | 1610 | 2100 | 2050 |
| with 1 month old emulsifier | | | | |
| amount of emulsifier | 1.4 | 1.4 | 1.4 | 1.4 |
| weight of batter, g/l | 314 | 422 | 340 | 304 |
| volume of cake from 400 g batter, ml | 2020 | 1675 | 1910 | 2100 |
| with 6 months old emulsifier | | | | |
| amount of emulsifier | 1.4 | 1.4 | 1.4 | 1.4 |
| weight of batter, g/l | 372 | 428 | 408 | 356 |
| volume of cake from 400 g batter, ml | 1900 | 1710 | 1670 | 2050 |

Experimental Series 3

Further experiments were carried out with $CO_2$-expanded emulsifier mixtures prepared in the manner described in Example 1. The emulsifier compositions (% by weight) are shown in Table 3A. HLB stands for hydrophilic-lipophilic balance.

TABLE 3A

| | Emulsifier composition, % b.w. | | | | | | | | | | | | | |
|---|---|---|---|---|---|---|---|---|---|---|---|---|---|---|
| Emulsifier component No. | 1 | 2 | 3 | 4 | 5 | 6 | 7 | 8 | 9 | 10 | 11 | 12 | 13 | 14 |
| "Artodan" CP 80 | | | | | | | | | | | | | | |
| "Artodan" SP 50 | | | | | | | | | | | | | | |
| "Artodan" SP 55 | | | | | | | | | | | | | | |
| "Dimodan" PM | | | | 35 | 35 | 5 | | | | | | | | |
| "Dimodan" PV | | | | | | | | | | | | | | |
| "Famodan" MS | | | | | | | | | | | | | | |
| "Lactodan" B 30 | | | | | | | | | | | | | 5 | |
| "Lactodan" 3-025 | | | | | 27 | | | 5 | 7.5 | 5 | | | | 7.5 |
| "Lactodan" 1315/90 | 5 | | | | | | | | | | | | | |
| "Lipodan" TL 50 | 81 | 79 | 86 | | | 84 | 86 | 84 | 81.5 | 81 | 84 | 79 | 84 | 84 |
| "Panodan" AB 100 | 4 | 2.5 | 4 | 2.5 | 2.5 | 2.5 | 4 | 2.5 | 2.5 | 4 | 2.5 | 2.5 | 2.5 | 2.5 |
| "Panodan" AM | 4 | 2.5 | 4 | 2.5 | 2.5 | 2.5 | 4 | 2.5 | 2.5 | 4 | 2.5 | 2.5 | 2.5 | |
| "Panodan" 150 | | | | | | | | | | | | | | |
| "Promodan" SP | | | | 54 | 27 | | | | | | | | | |
| "Promodan" SPV | | | | | | | | | | | | | | |
| "Steadan" 300 | 6 | 6 | 6 | 6 | 6 | 6 | 6 | 6 | 6 | 6 | 6 | 6 | 6 | 6 |
| "Triodan" 55 | | | | | | | | | | | | | | |
| Sugar ester (HLB = 11) | | 10 | | | | | | | | | 5 | 10 | | |
| Sum | 100 | 100 | 100 | 100 | 100 | 100 | 100 | 100 | 100 | 100 | 100 | 100 | 100 | 100 |

| Emulsifier component No. | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| "Artodan" CP 80 | | 9 | | | | | | | | 9 | | | | |

TABLE 3A-continued

| | Emulsifier composition, % b.w. | | | | | | | | | | | | | |
|---|---|---|---|---|---|---|---|---|---|---|---|---|---|---|
| "Artodan" SP 50 | | | | | | 9 | | 9 | | | | | | |
| "Artodan" SP 55 | 9 | | 9 | | | | | | | | | | | |
| "Dimodan" PM | 30 | 35 | 35 | 32.5 | 32.5 | 30 | | | 32.5 | 30 | | 4 | 8 | 35 |
| "Dimodan" PV | | | | | | | 32.5 | | | | | | | |
| "Famodan" MS | | | 5 | | | | | | | | | | | |
| "Lactodan" B 30 | | | | | | | | | | | | | | |
| "Lactodan" 3-025 | | | | | | | | | | | | | | |
| "Lactodan" 1315/90 | | | | | 9 | | | 9 | | | | 4 | | |
| "Lipodan" TL 50 | 3 | 3 | | | | | 84 | | | | 80 | 76 | 76 | 47 |
| "Panodan" AB 100 | | 2.5 | | 2.5 | 2.5 | | | 2.5 | 2.5 | | | | | 2.5 |
| "Panodan" AM | 5 | 2.5 | | | | | | | | | | | | 2.5 |
| "Panodan" 150 | | | | 5 | 5 | 10 | 10 | 5 | 5 | 10 | 14 | 10 | 10 | |
| "Promodan" SP | | | | | | | | | | | | | | |
| "Promodan" SPV | 53 | 48 | 48 | 54 | 47 | 48 | | 48 | 45 | 48 | | | | |
| "Steadan" 300 | | 3 | 6 | 6 | 3 | 6 | 3 | 6 | 3 | 6 | 6 | 6 | 3 | |
| "Triodan" 55 | | | | | | | | | | | | | | |
| Sugar ester (HLB = 11) | | | | | | | | | | | | | | |
| Sum | 100 | 100 | 100 | 100 | 100 | 100 | 100 | 100 | 100 | 100 | 100 | 100 | 100 | 100 |

Baking experiments were carried out using these emulsifier mixtures. The cake batter was prepared with the same composition as in Experimental Series 1, containing 2.1% by weight of emulsifier mixture having the age (after $CO_2$-treatment) shown in table 3C.

The results are shown in Table 3C, in which bulk weight pertains to the bulk weight in g/l of the cake batter prior to baking and volume to the volume in ml of the finished cake per 400 g of cake batter. For comparison it should be mentioned that similar experiments using emulsifier mixtures Nos. 1–4, but spray crystallized in the normal way, without expansion with $CO_2$, gave the results shown in Table 3B.

TABLE 3B

| No. | | Spray crystallized emulsifier |
|---|---|---|
| 1 | Bulk weight | 460 g/l |
| | Volume | 1625 ml |
| 2 | Bulk weight | 709 g/l |
| | Volume | 1100 ml |
| 3 | Bulk weight | 482 g/l |
| | Volume | 1625 ml |
| 4 | Bulk weight | 399 g/l |
| | Volume | 1775 ml |

TABLE 3C

| | Baking Experiments | | | | | | | | | |
|---|---|---|---|---|---|---|---|---|---|---|
| Age of emulsifier | 1 day | 3 days | 4 days | 7 days | 8 days | 1 month | 1½ months | 3 months | 4 months | 5 months |
| Emulsifier No. | | | | | | | | | | |
| 1 bulk weight | | | | 363 | | | | | | |
| volume | | | | 1900 | | | | | | |
| 2 bulk weight | | | | 358 | | | | | | |
| volume | | | | 1920 | | | | | | |
| 3 bulk weight | | | | 356 | | | | | | |
| volume | | | | 1810 | | | | | | |
| 4 bulk weight | | | | 288 | | | | | | |
| volume | | | | 2000 | | | | | | |
| 5 bulk weight | 342 | | | | | | | | 742 | |
| volume | 1880 | | | | | | | | — | |
| 6 bulk weight | | | | 370 | | | | | | 540 |
| volume | | | | 1830 | | | | | | 1450 |
| 7 bulk weight | | | | 356 | | | | | | 518 |
| volume | | | | 1810 | | | | | | 1550 |
| 8 bulk weight | | | | 348 | | | | 507 | | 564 |
| volume | | | | 1875 | | | | 1650 | | 1460 |
| 9 bulk weight | 392 | | | | | 530 | | | | |
| volume | 1775 | | | | | 1410 | | | | |
| 10 bulk weight | 363 | | | | | 472 | | | | |
| volume | 1900 | | | | | 1525 | | | | |
| 11 bulk weight | 385 | | | | | 486 | | | | |
| volume | 1800 | | | | | 1325 | | | | |
| 12 bulk weight | 358 | | | | | 401 | | | | |
| volume | 1920 | | | | | 1600 | | | | |
| 13 bulk weight | 374 | | | | | 526 | | | | |
| volume | 1920 | | | | | 1375 | | | | |
| 14 bulk weight | 374 | | | | | 513 | | | | |
| volume | 1850 | | | | | 1375 | | | | |
| 15 bulk weight | | | | | 302 | | 320 | | | |
| volume | | | | | 2100 | | 2090 | | | |
| 16 bulk weight | | | | | 330 | | | | | |
| volume | | | | | 1950 | | | | | |
| 17 bulk weight | | | | | 320 | | 384* | | | |
| volume | | | | | 2010 | | 1810* | | | |
| 18 bulk weight | | 308 | | | | | | | | |
| volume | | 1800 | | | | | | | | |

TABLE 3C-continued

| Age of emulsifier | Baking Experiments | | | | | | | | |
|---|---|---|---|---|---|---|---|---|---|
| | 1 day | 3 days | 4 days | 7 days | 8 days | 1 month | 1½ months | 3 months | 4 months | 5 months |
| 19 bulk weight | | 306 | | | | | | | | |
| volume | | 1970 | | | | | | | | |
| 20 bulk weight | | 278 | | | | | | | | |
| volume | | 1975 | | | | | | | | |
| 21 bulk weight | | 334 | | | | | | | | |
| volume | | 1825 | | | | | | | | |
| 22 bulk weight | | 294 | | | | | | | | |
| volume | | 2050 | | | | | | | | |
| 23 bulk weight | | | 314 | | | | | | | |
| volume | | | 2050 | | | | | | | |
| 24 bulk weight | | | 358 | | | | | | | |
| volume | | | 1890 | | | | | | | |
| 25 bulk weight | | | 364 | | | | | | | |
| volume | | | 1900 | | | | | | | |
| 26 bulk weight | | | 346 | | | | | | | |
| volume | | | 1900 | | | | | | | |
| 27 bulk weight | | | 360 | | | | | | | |
| volume | | | 1875 | | | | | | | |
| 28 bulk weight | | | 300 | | | | | | | |
| volume | | | 2050 | | | | | | | |

*Dosage of emulsifier mixture only 1.4% b.w.

It is seen that even with these emulsifiers there is obtained a good increase in volume ("airiness") of the finished cake when the emulsifier has been subjected to $CO_2$-treatment and that at least a majority of the emulsifier compositions maintain the improved effect at least a week after the $CO_2$-treatment and many of them even an improved foaming effect after some 6 weeks storage or more.

Experimental Series 4

Experiments were carried out to assess the effect of the $CO_2$-treatment of the emulsifier on the keeping qualities of bread. The keeping qualities are expressed by the softness of the bread measured by an "Instron" ® foodtester which shows the pressure, expressed in $g/cm^2$, which must be applied to a plunger in order to cause a 25% compression of a standard slice of bread.

The bread dough has the following composition:
2000 g Danish wheat flour adjusted to a fall number of 250±25 by the aid of malt flour
10 g emulsifier
90 g Danish baker's yeast
30 g NaCl
30 g finely pulverized sucrose
about 1000 g water
the exact amount of water being determined on a "Brabender" ® farinograph to obtain a consistency of 400 farinograph units.

The temperature was adjusted at a dough temperature of 26° C.

The baking is carried out as follows:
(1) The ingredients are mixed in a "Diosna" ® mixer, 100 revolutions in 1st gear and 1400 revolutions in 2nd gear.
(2) Rest for 2×10 minutes at 30° C. with one punch.
(3) Weighed into portions of 400 g, rest for 10 minutes and worked up.
(4) The dough is moulded on a "Mono" moulder.
(5) Is fermented at 32°-34° C. and 85-90% relative humidity for 45 minutes.
(6) Baked for 30 minutes at 220° C. by steam in a closed tin in a "Monsun" ® oven.
(7) Is taken out of the oven and of the tin.

In the first of these experiments, "Dimodan" PM was used, one batch ground in a coffee mill and another carbon dioxide-expanded according to the invention. It is seen from Table 4 that the $CO_2$-treatment gave a better softness, i.e. better shelf life of the bread.

TABLE 4

| Emulsifier | Softness, $g/cm^2$ at 25% compression after | |
|---|---|---|
| | 1 day | 3 days |
| "Dimodan" PM, ground | 53 | 103 |
| "Dimodan" PM, expanded | 46 | 95 |

Further experiments were carried out with the same dough recipe and baking, but with various emulsifiers, always in an amount of 0.5% of the flour weight. The results are shown in Table 5 in the beginning of which there is shown for comparison the results firstly with "Amidan" SDM-T without $CO_2$-treatment, viz. because of its property as the best powdery monoglyceride on the market; and secondly with "Dimodan" PM-hydrate as example of the best possible monoglyceride effect when the emulsifier has been dispersed in water before being admixed with the other dough components.

It is seen that improved shelf life of the bread is obtained in comparison with bread prepared with a GM-emulsifier not treated with $CO_2$. It is well-known that the shelf life is better when using monoglyceride dispersed in water than when using the powdery MG.

TABLE 5

| | Softness, $g/cm^2$ at 25% compression after | |
|---|---|---|
| | 1 day | 3 days |
| "Amidan" SDM-T | 63 | 112 |
| "Dimodan" PM-hydrate | 46 | 79 |
| $CO_2$-expanded MG products: | | |
| 60 parts "Dimodan" PM | | |
| 40 parts "Dimodan" OT | 63 | 99 |
| 90 parts "Dimodan" PM | | |
| 10 parts lecithin | 58 | 92 |
| Control, no emulsifier | 147 | 217 |

Experimental Series 5

Use of $CO_2$-expanded emulsifier in preparing soft ice

"Gatodan" 1304, spray crystallized while using $CO_2$ as described in Example 1 was tested in a powder soft serve for ice-cream having the following composition IV, (compositions I–III being for comparison), expressed in % by weight:

|  | I | II | III | IV |
|---|---|---|---|---|
| Whey powder | 16.70 | 16.70 | 16.70 | 16.70 |
| Sugar | 14.50 | 14.50 | 14.50 | 14.50 |
| "Cremodan" Super | 0.30 | 0.30 | | |
| "Gatodan" 505 (gel) | | | 0.50 | |
| "Gatodan" 1304 ($CO_2$ spray) | | | | 0.50 |
| "Gelodan" PI | 0.25 | 0.25 | 0.25 | 0.25 |
| Maltodextrin | 1.75 | 1.75 | 1.75 | 1.75 |
| Water | 66.50 | 66.50 | 66.50 | 66.50 |
|  | 100.00 | 100.00 | 100.00 | 100.00 |

The mixing procedures for the four compositions were as follows:

I: A dry mixture of "Gelodan" PI and sugar is added to water together with the whey powder. After this "Cremodan" Super is added and there is heated to 78° C. Then the mix is homogenized and cooled to 5° C., left standing at 5° C. for 24 hours and frozen. II, III and IV: A dry mixture of "Gelodan" PI and sugar is added to the water together with whey powder at about 10° C. Then "Cremodan" Super, "Gatodan" 505 or "Gatodan" 1304 is added under vigorous stirring. The mix is left standing for 24 hours at 5° C., stirred vigorously and frozen.

Results on the soft serve machine were as follows:

I: This experiment is a standard for use as reference for the other experiments. Overrun (i.e. volume increase) is 90%. Drop time 9 minutes.

II: Undissolved emulsifier clogged the freezer and the experiment was discarded.

III: The product had a wet appearance. Maximum overrun 90%. Drop time 5–6 minutes. Clearly inferior to the standard.

IV: The result was better than the result of experiment I. Maximum overrun 100%. Drop time 5 minutes. Consistency and general impression were better than those of the standard.

These experiments clearly show that $CO_2$ treated "Gatodan" 1304 has properties giving results in soft ice that cannot be achieved with the ordinary emulsifier. It should especially be noticed that the $CO_2$ treated "Gatodan" 1304 may be used without being heated.

The overrun and drop time referred to were determined by the following procedure:

1. A 155 ml beaker (the swelling beaker) is filled with soft ice, the top is swept away and hence the overrun determined.

2. The plunger in a 50 ml plastic syringe from which the bottom has been cut away is drawn up to the 10 ml mark after which 25 ml of soft ice are drawn into the syringe which is thereafter adjusted to leave a 20 ml column in the syringe; thereupon the top is swept away.

3. The column is pressed out onto a net with mesh size 13 × 13 mm and thread diameter of 2 mm, placed in a 500 ml beaker, and another 500 ml beaker is placed on top thereof. The time to the first drop falls through the net is determined by a stop watch and is defined as the drop time.

Experimental Series 6

Use of a $CO_2$-expanded emulsifier in preparing icings

"Gatodan" 1304, spray crystallized while using $CO_2$ as described in Example 1 was tested in a cake icing having the following composition (parts by weight):

| Shortening (partially hydrogenated soybean oil, m.p. 35° C.) | 25 parts |
|---|---|
| Icing sugar | 100 parts |
| Water | 20 parts |
| $CO_2$-expanded "Gatodan" 1304 | x % b.w. |

Sugar and shortening were mixed for 2 minutes on a "Hobart" mixer under stirring in 1st gear. Water and emulsifier were added and stirring was carried out for 2 minutes in 2nd gear. The mass was scraped down and stirred for further 2 minutes in 2nd gear.

The results appear from Table 6 below.

TABLE 6

| Dosage of $CO_2$-treated emulsifier, % b.w. | Specific volume of icing, ml/g |
|---|---|
| 0.30 | 1.03 |
| 0.60 | 1.11 |
| 0.92 | 1.30 |
| 1.20 | 1.42 |

Experimental Series 7

Use of $CO_2$-expanded emulsifier in preparing toppings

"Gatodan" 1304, spray crystallized while using $CO_2$ as described in Example 1 was used in a topping having the following composition (parts by weight):

| Shortening (partially hydrogenated soybean oil, m.p. 35° C.) | 25 parts |
|---|---|
| Sugar | 6 parts |
| Milk powder | 11 parts |
| Water | 67 parts |
| $CO_2$-expanded "Gatodan" 1304 | x % b.w. |

Emulsifier, water, sugar and milk powder were mixed in a "Hobart" mixer. The fat (shortening) is melted and added. The mix is whipped at 30° C. for 3 minutes in 3rd gear.

| Dosage of $CO_2$-treated emulsifier, % b.w. | Specific volume of topping, ml/g |
|---|---|
| 1.20 | 5.19 |
| 1.60 | 6.12 |
| 2.00 | 6.74 |

I claim:

1. A method for the production of a powdered emulsifier composition having improved leavening and aerating properties, comprising the steps of (a) heating an emulsifier composition to a temperature sufficient to melt the emulsifier, (b) gas treating the composition in a pressure vessel while the emulsifier is in the melted state with pressurized inactive gas until equilibrium is reached between the gas dissolved in the melted emulsifier and the gas in the atmosphere of the pressure vessel and (c) spray crystallizing the gas treated composition to evaporate the gas and cool the composition, thereby forming a powder.

2. A method according to claim 1, wherein the gas treatment is carried out with carbon dioxide at a $CO_2$ pressure of 30 to 100 bar.

3. A method according to claim 2, wherein the gas treatment is carried out batchwise with substantially pure, gaseous carbon dioxide at a $CO_2$ pressure of about 60 bar.

4. A method according to claim 2, wherein the gas treatment is carried out continuously by pumping liquid carbon dioxide into a pressurized vessel containing the composition with emulsifier present in the molten state, the amount of liquid $CO_2$ being maintained at maximum 10% by volume of amount of composition.

5. A method according to claim 1, wherein the gas treatment is carried out with nitrogen at an $N_2$ pressure of 50 to 180 bar.

6. A method for treating an emulsifier composition for use in the prepartion of leavened bakery products and whipped desserts to obtain a pulverulent form having improved leavening and aerating properties, said emulsifier composition containing at least one distilled monoglyceride of a fatty acid or salt or ester thereof comprising the steps of (a) heating the emulsifier composition to melt all fatty acid based emulsifier therein, (b) gas treating the composition in a pressure vessel while the fatty acid based emulsifier is in the molten state at an elevated temperature with an inactive gas until equilibrium is reached between the gas dissolved in the melted emulsifier and the gas in the atmosphere of the pressuure vessel and (c) spray crystallizing the gas treated composition to evaporate the gas and cool the composition, thereby forming a powder.

7. A method for treating an emulsifier composition as claimed in claim 6, wherein the gas treatment is carred out with carbon dioxide at a $CO_2$ pressure of 30 to 100 bar.

8. A method for treating an emuslifier composition as claimed in claim 7, wherein the gas treatment is carried out batchwise with substantially pure, gaseous carbon dioxide at a $CO_2$ pressure of about 60 bar.

9. A method for treating an emulsifier composition as claimed in claim 7, wherein the gas treatment is carried out continuously by pumping liquid carbon dioxide into a pressurized vessel containing the composition with emulsifier present in the molten state, the amount of liquid $CO_2$ being maintained at maximum 10% by volume of the amount of composition.

10. A method for treating an emuslifier composition as claimed in claim 6, wherein the gas treatment is carried out with nitrogen at an $N_2$ pressure of 50 to 180 bar.

11. A method according to claim 6, wherein said composition contains at least one of a fatty acid based emulsifier which is not a distilled monoglyceride and an edible finely pulverized solid carrier.

12. A method according to claim 11, wherein the gas treatment is carried out with at least one of carbon dioxide and nitrogen and in which the composition is heated to a temperature within the range of 45° to 100° C.

13. A method according to claim 12, whrein the composition is heated to a temperature which is 5° to 20° C. above the melting range of the fatty acid based emuslifier and in which the gas treatment is carried out with carbon dioxide at a $CO_2$ pressure of 30 to 100 bar.

* * * * *